Dec. 19, 1944.    R. E. REASON    2,365,592
ELECTRICAL MEASURING APPARATUS
Filed May 31, 1941    3 Sheets-Sheet 1
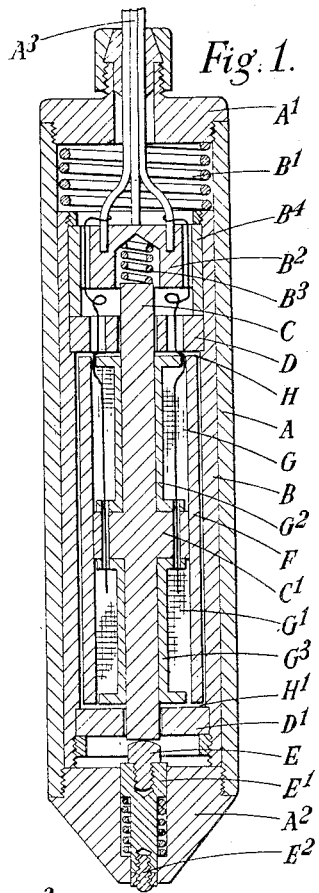
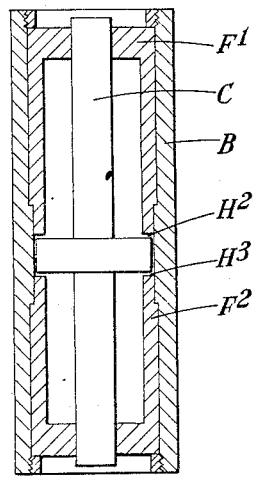
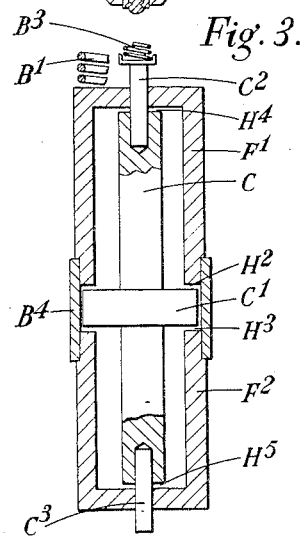
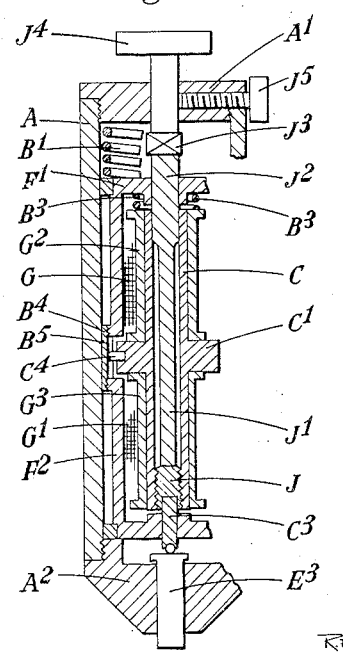
INVENTOR
R. E. REASON
BY Blair & Kilcoyne
ATTORNEYS Dec. 19, 1944.   R. E. REASON   2,365,592
ELECTRICAL MEASURING APPARATUS
Filed May 31, 1941   3 Sheets-Sheet 2

INVENTOR
R. E. REASON
BY
Blair & Kilcoyne
ATTORNEYS

Dec. 19, 1944.  R. E. REASON  2,365,592
ELECTRICAL MEASURING APPARATUS
Filed May 31, 1941  3 Sheets-Sheet 3
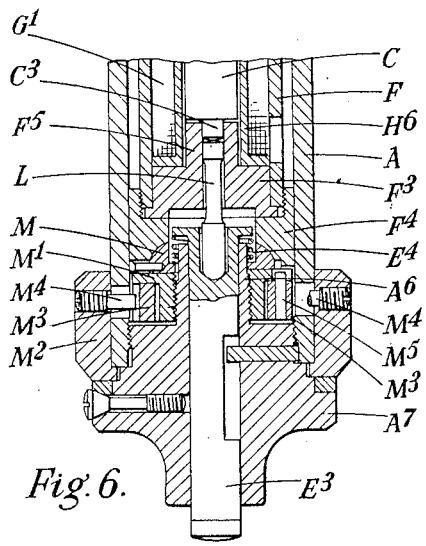
Fig. 6.
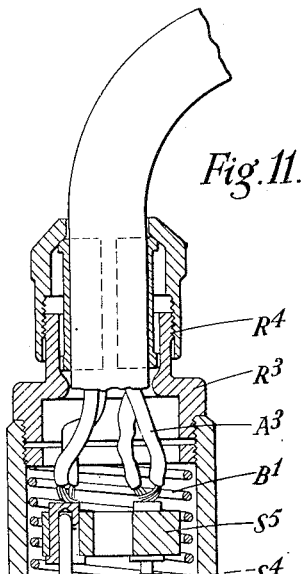
Fig. 11.
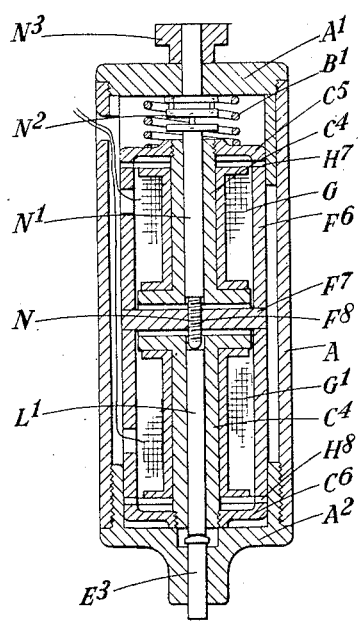
Fig. 7.
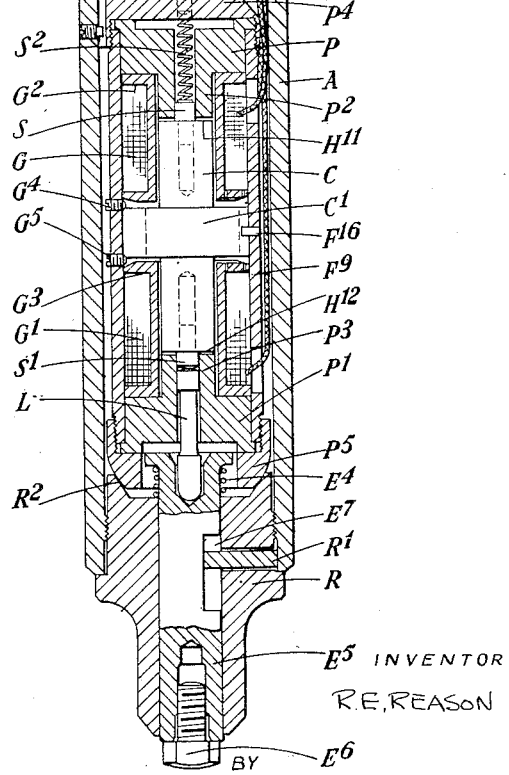
INVENTOR
R. E. REASON
BY Blair & Kilcoyne
ATTORNEYS Patented Dec. 19, 1944

2,365,592

UNITED STATES PATENT OFFICE 2,365,592

ELECTRICAL MEASURING APPARATUS

Richard Edmund Reason, Leicester, England, assignor to Kapella Limited, Leicester, England, a company of Great Britain Application May 31, 1941, Serial No. 396,228
In Great Britain May 30, 1940

18 Claims. (Cl. 33—147)

(Granted under the provisions of sec. 14, act of March 2, 1927; 357 O. G. 5)

This invention relates to electrical measuring apparatus of the kind in which measuring currents controlled by two electromagnetic detector devices, e. g. choking coils or transformers, are differentially controlled by a detecting member, such for example as a stylus or the like, which is moved in accordance with variations in the value to be measured. The main object of the invention is to provide apparatus which, while being compact in construction, will be accurate in operation throughout its range of measurement.

To this end, in apparatus according to the present invention the coils of the two detector devices are arranged substantially coaxially within a common casing, and a longitudinally movable detecting member extends through that area at one end of the casing which lies in alignment with the detecting devices, longitudinal movement of the detecting member causing relative movement of two parts of each of the magnetic circuits of the detector devices so that the air gaps, and therefore the measuring currents controlled by the detector devices, are differentially varied in accordance with variations in the value to be measured.

Preferably, the detecting member is substantially coaxial with the detector coils, the casing containing the detector devices being conveniently tubular and preferably of circular cross-section. In a preferred arrangement the casing, detector devices and detecting member are arranged as bodies of revolution having a common axis.

One part of each magnetic circuit may be fixed relatively to the casing within the normal range of operation of the apparatus, the other or movable part of the magnetic circuit being moved by the detecting member relatively to the said fixed part. With a view to avoiding damage to the apparatus due to movement of the detecting member beyond its normal range so as completely to close the air gaps, the fixed part of each magnetic circuit may be loaded by a spring which, when the detecting member moves beyond its normal range of travel, will yield and thus permit the two parts of the magnetic circuit to move as a unit.

The current flowing through the coils of the two detector devices may have an appreciable heating effect, principally at the axis of the coils, so that temperature changes may tend to cause relative variation of the air gaps and thus a "drift" of the associated measuring instrument until steady temperature conditions have been reached. According to a further feature of the invention the fixed parts of the two magnetic circuits may be formed integral or connected together to constitute a single fixed element, whilst the movable parts of the two magnetic circuits may be formed integral or connected together to constitute a single movable element, the "effective mid-points" of the two elements being located in predetermined positional relationship with respect to the detecting member and a fixed part of the casing adjacent thereto, the parts determining such location respectively for the fixed and movable elements being so arranged as to be subjected to substantially the same temperature conditions. Conveniently the locating parts are maintained at substantially the same temperature by arranging them close to, and preferably in contact with each other. The term "effective mid-point" of the fixed (or movable) element is to be understood as meaning that point of the element with respect to which the poles of the fixed (or movable) parts of the two magnetic circuits make equal movements for any given temperature change.

Thus, no appreciable relative variation in the dimensions of the air gaps will occur due to variations in temperature.

The magnetic circuits may be arranged in various ways. For example, the fixed part of each magnetic circuit may comprise an armature whilst the movable part comprises a core member carrying the corresponding coil or coils and a surrounding pot. In another arrangement the fixed part of each magnetic circuit comprises a pot or sleeve surrounding the corresponding detector coil or coils whilst the movable part of the circuit comprises a core member. In yet a further arrangement the fixed part of each magnetic circuit comprises a core member whilst the movable part of the circuit comprises a pot surrounding the said coil. In either of the two latter arrangements the detector coil or coils may be carried either by the pot or by the core.

If desired means for manually effecting relative adjustment of the two parts of each magnetic circuit may be provided for initially determining the zero setting of the apparatus.

Any suitable form of measuring or indicating circuit may be employed but in a preferred arrangement the two detector coils are connected to two rectifiers having two loading impedances respectively, and means are provided for measuring the difference between the potential drops across the impedances, the arrangement being such that there is no direct connection between points of unlike electrical polarity on the two impedances. Suitable arrangements of this type are described and claimed in the specification of the present applicant's concurrent United States of America patent application Serial No. 396,227.

The invention may be carried into practice in various ways and several convenient constructions in accordance therewith will now be described by way of example with reference to the accompanying drawings in which:

Figure 1 is a sectional side elevation of one construction,

Figures 2 to 6 are sectional views of parts of modified forms of the construction shown in Figure 1, Figure 7 is a similar view of another construction.

In all the figures the same reference characters are used for corresponding parts.

Figure 5:
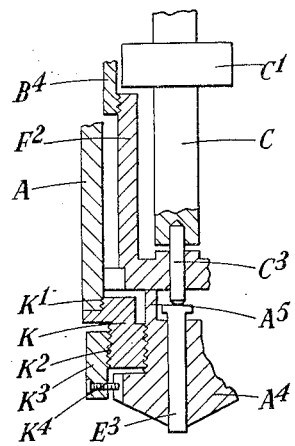

In the construction shown in Figure 1, the gauge head comprises a tubular casing A of circular cross-section, for example of metal such as steel. The ends of the casing A are closed by plugs $A^1$ and $A^3$ which screw into the ends of the casing, the plug $A^1$ at the upper end of the casing being bored for the passage of electric leads $A^3$ connected to the electromagnetic devices within the casing as hereinafter described whilst the plug $A^2$ at the lower end constitutes a cap or nose for the operative end of the gauge head.

A brass safety tube or sleeve B which is a sliding fit within the casing A is pressed downwardly from the plug $A^1$ by a compression spring $B^1$ between the upper end of the sleeve and the lower surface of the plug, this spring normally maintaining the lower end of the sleeve firmly against the upper surface of the lower end plug $A^2$. Mounted within the upper end of the sleeve B is an insulating block $B^2$ having in its lower face a recess containing a compression spring $B^3$ which is somewhat lighter than the spring $B^1$, the lower end of the spring $B^3$ acting on the upper end of a core C of magnetic material which is coaxial with the casing A. Spaced a short distance below the block $B^2$ is an armature D which fits within and is secured to the sleeve B, upward movement of the armature within the sleeve being prevented by a spacing member $B^4$. A second armature $D^1$ is secured within the sleeve B a short distance above the upper surface of the end plug $A^2$. The central core C extends freely through apertures in the armatures D and $D^1$, the spring $B^3$ tending to press the lower end of the core into engagement with a magnetic insulator E e. g. of brass, carried at the upper end of a spring-loaded plunger $E^1$ which extends freely into a central hole in the plug $A^2$ and carries at its lower end a contact tip $E^2$, such for example as a carrier for a diamond. The plunger $E^1$, together with the insulator E and the tip $E^2$, thus constitutes a detecting member which is axially movable so as to transmit movement to the central core C as hereinafter described.

Arranged within a tube or pot F of magnetic material in the sleeve B and extending between the armatures D and $D^1$ are two choking coils G and $G^1$ which respectively constitute the two detector elements, the two coils being wound on bobbins $G^2$ and $G^3$ encircling the core C so as to be coaxial with the detecting member and with the core C. The adjacent ends of the bobbins $G^2$ and $G^3$ are fixed to an enlarged central portion $C^1$ of the core C, this central portion being fixed to the pot F so that the core, the coils and the pot move longitudinally as a unit. The magnetic circuit of each choking coil is thus constituted by a fixed part, namely the armature D or $D^1$, and a relatively movable part, namely the appropriate end of the core C, the pot F and the central portion $C^1$ of the core, so that axial movement of the core C, coils G, $G^1$ and surrounding pot F will cause differential variation of the air gaps H and $H^1$ between the armatures D and $D^1$ respectively and the adjacent ends of the pot F.

The electric leads $A^3$ from the coils G and $G^1$ are connected to the secondaries of a main supply transformer, preferably through suitable swamping resistances, the coils being also connected to a measuring or indicating circuit. For example, any one of the measuring or indicating circuits described in the specification of the concurrent application above referred to may be employed.

When the gauge head is in operation the core C, coils G and $G^1$ and pot F are moved axially within the casing A relatively to the armatures D and $D^1$ by axial movement of the diamond carrier $E^2$ in accordance with variations in the value to be measured, the air gaps H and $H^1$ between the two armatures D and $D^1$ and the corresponding ends of the pot F being thus differentially varied. The resulting relative variation in the currents controlled by the detector coils G and $G^1$ thus causes variations in the indications or measurements on the measuring instrument.

In the event of the diamond carrier $E^2$ being forced up so far that the upper air gap H is completely closed, the armatures D and $D^1$ and the brass safety tube B will be moved bodily upwards within the casing A against the spring $B^1$ bearing against the upper end of the safety tube B. This spring will yield until the diamond has receded into the lower end plug $A^2$ of the gauge head, strain or damage to the parts within the casing being thus prevented.

In modified constructions, the modified parts of which are shown in Figure 2 or Figure 3, the coils G and $G^1$ instead of moving with the surrounding pot, are fixed respectively in two pots $F^1$ and $F^2$ having their inner or adjacent ends open and spaced apart, the core C (or as shown in Figure 3 extensions $C^2$ and $C^3$ of non-magnetic material thereon) sliding through guide apertures in the outer or closed ends of the pots. The detecting member then acts on the lower end of the core (or the corresponding extension $C^3$) so as to move the core C relatively to the pots $F^1$ and $F^2$ whose inner ends are suitably interconnected, for example by the brass sleeve B. The central enlarged part $C^1$ of the core C is so shaped as to lie in the gap between the adjacent inner ends of the pots $F^1$ and $F^2$ and is thus moved relatively to the pots to cause differential variation of the air gaps $H^2$ and $H^3$. By providing extensions $C^2$ and $C^3$ of non-magnetic material, for example brass, as shown in Figure 3, on the core C so that there is an air gap also between each end of the core and the adjacent end wall of the corresponding pot, longitudinal movement of the core will cause simultaneous variation of two air gaps $H^2H^4$ and $H^3H^5$ in each magnetic circuit. As shown in Figure 3 the interconnected pots $F^1$ and $F^2$ constituting the fixed parts of the magnetic circuits may be held a fixed distance apart by a spacing cylinder $B^4$ of brass or other non-magnetic material and the spring $B^1$ may act directly on the upper surface of the upper pot $F^1$ so that the pots act in the capacity of the safety sleeve of the construction shown in Figure 1, the light spring $B^3$ being preferably disposed between the upper extension $C^2$ of the core and the upper end plug of the outer casing.

In the construction shown in Figure 4, which is a modification of that shown in Figure 3, an adjusting device is provided for effecting relative movement of the fixed and movable parts of the magnetic circuit. To this end the core C has a central bore which is screw-threaded at its lower end to receive a nut J with a recess in its lower surface for the lower core extension $C^3$. The nut J is formed on the end of a shank $J^1$ which extends upwardly through the central bore and has an enlarged end $J^2$ which fits within the bore so as to constitute a bearing for the upper end of the shank. The end $J^2$ is connected by a flexible coupling $J^3$ (indicated diagrammatically) to an adjusting knob $J^4$ which can be clamped in position by a set screw $J^5$. The extension $C^3$ carries at its lower end a ball thrust bearing which is pressed into contact with the upper end of a plunger $E^3$ carrying the detector (not shown) by means of the light coil spring $B^3$ arranged, in this case, between the upper end of the core C and the undersurface of the end of the upper pot $F^1$.

It will be appreciated that rotation of the adjusting knob $J^4$ causes corresponding rotation of the nut J which accordingly moves upwardly or downwardly in the bore in the core C thereby adjusting the position of the plunger $E^3$ relatively to the core, which, together with the coils and the central part $C^1$ (the armatures of the pots $F^1$ and $F^2$), constitutes the movable part of the device. It is thus possible, by means of the knob $J^4$, to adjust the initial zero setting of the apparatus. In order to prevent rotation of the core C by the knob $J^4$ a brass spacing sleeve $B^4$ between the inner ends of the pots $F^1$ and $F^2$ has a longitudinal slot $B^5$ which cooperates with a stud $C^4$ on the central portion $C^1$ of the core to provide a splined connection between the core and the fixed pots.

An alternative method of adjusting the initial setting of the apparatus is shown in Figure 5. In this case the lower end of the pot $F^2$ bears against the end of a cylindrical flange $A^5$ of an end plug $A^4$ which, instead of screwing into the end of the casing A, screws into an internally screw-threaded nut K having an external screwthread $K^1$ which engages in the end of the casing A and a second external screwthread $K^2$ for a ring $K^3$ carrying one or more inwardly directed pins $K^4$ projecting into axial slots in the plug $A^4$. Thus when the ring $K^3$ is rotated, the movement is transmitted by the pin or pins $K^4$ to the plug $A^4$ which, as it rotates screws upwardly or downwardly in the nut K to cause axial adjustment of the pots $F^1$ and $F^2$ relatively to the core C.

An improved form of the construction of Figure 5 is shown in Figure 6 which is a section of the lower end of the gauge with the right-hand half of the section revolved through 90° in order to show the details of an Oldham coupling employed. This construction has a tubular pot F (as in the construction shown in Figure 1) with its lower open end closed by a plug $F^3$ of magnetic material held in position by an annular cap $F^4$. The plug $F^3$ has a central portion $F^5$ projecting upwardly towards the lower end of the core, the arrangement thus being such that the variable air gap $H^5$ of the lower detecting element is within the coil. A similar construction may be employed at the upper end of the pot. The core C has a lower extension $C^3$ which engages the upper end of an intermediate member L having a hemi-spherical end which fits into an appropriately shaped recess in the detector plunger $E^3$ which is pressed upwardly against the member L by a spring $E^4$.

The lower surface of the cap $F^4$ is spherically curved to engage an intermediate bearing member M between it and the upper surface of a nut $M^1$ which is screwed on to a screwthreaded internal boss $A^6$ formed on the upper surface of the plug $A^7$ for closing the lower end of the casing A. An external ring $M^2$ which is rotatable around the outside of the casing A drives the plate $M^3$ of the Oldham coupling by means of a pair of inwardly projecting radial pins $M^4$ passing through slots in the casing A. The coupling plate $M^3$ in turn drives the nut $M^1$ through two pins $M^5$ which are parallel to the axis and extending into slots in a flange at the upper end of the nut $M^1$. The end plug $A^7$ is firmly fixed in the end of the casing A. Thus when the ring $M^2$ is rotated, the nut $M^1$ moves up or down the screw-threaded boss $A^6$ to cause axial adjustment of the pot F. Rotation of the nut $M^1$ is, of course, limited to less than 180°.

The current flowing through the detector coils may have an appreciable heating effect with consequent variations in the effective lengths of the parts, more particularly at the longitudinal axis, so that the upper air gap is liable to be varied relatively to the lower air gap with a consequent tendency for the measuring instrument to have a drift until steady temperature conditions have been reached. According to a further feature of the invention this difficulty is overcome by locating the "effective mid-points" of the fixed and movable parts of the magnetic circuits (for the zero reading of the instrument) in predetermined positional relationship with respect to the lower end of the casing and the upper end of the detecting member, the parts which so locate the "effective mid-points" being maintained at substantially the same temperature. Differences of temperature which are inevitable may be compensated for by including in the locating parts materials having different coefficients of expansion, though it will be more usual for the locating parts to have substantially the same coefficients of expansion.

In one arrangement embodying such temperature compensation shown in Figure 7, the coils G and $G^1$ of the detector elements are carried on a hollow core member $C^4$ of magnetic material having upper and lower end flanges $C^5$ and $C^6$ which form the poles of the two fixed magnetic circuits. The lower end flange $C^6$ abuts against the inner surface of the end plug or nose $A^2$ carried by the casing A whilst the spring $B^1$ bearing against the inner surface of the upper end plug $A^1$ acts on the upper end flange $C^5$ of the hollow core member $C^4$ which, together with the detector windings G and $G^1$, thus constitutes the parts of the two magnetic circuits which are fixed within the normal range of operation of the instrument. The movable parts of the two magnetic circuits are constituted by a pot $F^6$ of magnetic material surrounding the two detector windings and, as in the construction shown in Figure 1, having at its mid-point a transverse cross bar $F^7$ which fits closely into the diametrically opposite holes in the pot and is provided with a central internally screwthreaded aperture $F^8$ in which engages an externally threaded stud N connected at its upper end to a rotatable rod $N^1$ passing freely through the part of the hollow core $C^4$ lying within the upper coil G. The lower end of the threaded stud N bears on the upper end of a spacing pillar $L^1$ whose lower end bears against the detecting member $E^3$, for example the diamond carrier as above described. The upper end of the rotatable rod $N^1$ is connected through a flexible coupling $N^2$ to an adjusting head or knob $N^3$ outside the upper end plug $A^1$ of the casing A.

Thus, since the lower end of the hollow core member $C^4$ bears against the fixed lower end plug $A^2$ whilst the lower end of the spacing pillar $L^1$ bears against the detecting member $E^3$, the hollow core $C^4$ and the spacing pillar $L^1$ locate the mid-points of the fixed and movable parts of the magnetic circuits in a predetermined positional relationship with respect of the casing and the detecting member, these locating parts being in intimate contact so that they will tend to be maintained at the same temperature.

With the detecting member $E^3$ in its normal or zero position, the transverse bar $F^7$ within the pot $F^6$ will normally lie substantially mid-way between the upper and lower end flanges (or fixed poles) $C^5$ and $C^6$ of the core $C^4$ so that the air gaps $H^7$ and $H^8$ between these flanges and the upper and lower ends (or movable poles) of the pot $F^6$ will be substantially equal, the "effective mid-points" of the fixed and movable elements being then substantially coincident. When the detecting member $E^3$ is moved axially upwards the spacing pillar $L^1$ transmits movement to the surrounding pot $F^6$ through the transverse bar $F^7$ so that the upper air gap $H^7$ is reduced whereas the lower air gap $H^8$ is correspondingly increased. Since the "effective mid-points" of the fixed and movable elements are loated as above described by the core member $C^4$ and spacing pillar $L^1$, which locating parts by reason of their arrangement and mutual contact will be subjected to substantially the same temperature conditions, the said "effective mid-points" will remain substantially coincident despite changes of temperature. Thus, no appreciable relative variation of the air-gaps will be caused by temperature variations. Moreover, even if the core $C^4$ and pot $F^6$ are not maintained at equal temperatures (as may be the case since these parts are radially spaced apart), any alteration in the temperature will result in equal alterations in the dimensions of the air gaps due to relative expansion or contraction of the core member and pot.

For initial zero setting of the apparatus the adjusting head or knob $N^3$ may be rotated so as to turn the rotatable rod $N^1$ about its longitudinal axis thus causing, through the bar $F^7$, axial movement of the pot $F^6$ relatively to the spacing pillar $L^1$.

Figure 8:
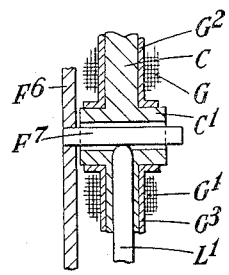
Figure 8 is a sectional view of part of a modified form of the construction shown in Figure 7, and Figures 9 to 11 are sectional side elevations of further constructions.

Figure 8 shows the arrangement of the central part of a construction similar to that shown in Figure 7 but in which the means for adjusting the initial zero setting is omitted. In this arrangement, the core C is solid, as in the arrangement shown in Figure 1, and the transverse bar $F^7$ passes freely through an aperture in the central enlarged portion $C^1$ of the core, there being sufficient clearance between the bar and the walls of the aperture to permit the desired relative movement between the fixed and moving parts of the apparatus. The spacing member $L^1$ bears directly against the underside of the cross-bar $F^7$.

Figure 9:
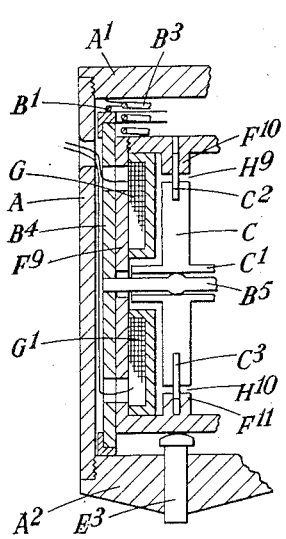

In a modified form of this construction shown in Figure 9, the fixed parts of the two magnetic circuits are constituted by a central metal core member C similar to the core of the construction shown in Figure 5 carrying the detector coils G and $G^1$ and having mid-way in its length a cross-bar $B^5$ passing through an aperture in the enlarged part $C^1$ of the core and rigidly connected to a metallic spacing sleeve $B^4$ (like the sleeve B of the construction shown in Figure 1) within the outer casing A. The lower end of the spacing sleeve $B^4$ bears against the upper surface of the lower end plug $A^2$ whilst its upper end acts through the spring $B^1$ on the inner surface of the upper end plug $A^1$. The movable parts of the magnetic circuits are constituted by a pot $F^9$ which is closed at both ends, surrounds the two detector coils G and $G^1$, and is in intimate sliding contact with the inner surface of the spacing sleeve $B^4$. The upper end of the pot $F^9$ acts through a light spring $B^3$ on the inner surface of the upper plug $A^1$ so that the lower end of the movable pot $F^9$ is spring-pressed against the upper end of the detecting member $E^3$. The upper and lower end walls of the movable pot are provided with inwardly projecting bosses $F^{10}$ and $F^{11}$ which constitute the movable poles of the magnetic circuits whilst the upper and lower ends of the fixed core C constitute the fixed poles of the magnetic circuits, the end walls of the pot $F^9$ being provided with axial holes to receive suitable guide extensions $C^2$ and $C^3$ made of non-magnetic material, for example brass, on the ends of the core.

When a diamond carrier $E^3$ is moved upwardly the movable pot $F^9$ is correspondingly moved relatively to the fixed core C and the surrounding spacing sleeve $B^4$, thus increasing the air gap $H^9$ between the upper wall of the pot $F^9$ and the upper end of the core C and decreasing the air gap $H^{10}$ between the lower wall of the pot $F^9$ and the lower end of the core C. Since the spacing sleeve $B^4$ and the pot $F^9$ locate the "effective mid-points" of the fixed and movable elements relatively to the fixed end plug $A^2$ of the casing A and the upper end of the detecting member $E^3$, and these locating parts are in intimate contact with each other and therefore at substantially the same temperature, the said "effective mid-points" will remain coincident in spite of changes of temperature, thus again providing temperature compensation as above described.

This arrangement may also be furnished with an adjusting head for zero setting, though in this instance adjustment of the head will vary the axial position of the sliding pot relatively to the fixed central core and spacing sleeve connected thereto.

Figure 10:
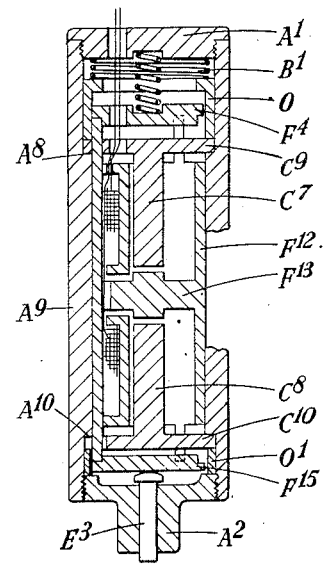

In yet a further arrangement shown in Figure 10 the fixed parts of the magnetic circuits are constituted by two central cores $C^7$ and $C^8$ spaced apart at their inner ends and each having at its outer end a flange or disc $C^9$ and $C^{10}$ respectively, the disc $C^9$ of the upper core $C^7$ being pressed against a shoulder $A^8$ formed on the inside wall of the casing $A^9$ by a pressure cylinder O acted upon by the usual spring $B^1$ bearing against the upper end plug A¹ whilst the flange C¹⁰ of the lower core C⁸ is similarly pressed against a shoulder A¹⁰ in the wall of the casing by a thrust ring or cylinder O¹, the lower surface of which bears the lower end plug A². The movable parts of the magnetic circuits are constituted by a pot F¹² surrounding the coils and making a close sliding fit within the outer casing A⁹, the pot having mid-way in its length an integral transverse disc F¹³ which thus lies in the gap between the inner ends of the two cores C⁷ and C⁸. The two ends of the pot F¹² are formed with circumferentially spaced lugs (two of which are shown on the right hand side of the figure) which extend freely through openings in the flanges C⁹ and C¹⁰ at the outer ends of the cores so that two end walls F¹⁴ and F¹⁵ of the pot F¹⁰ lie respectively above and below the core flanges C⁹ and C¹⁰ and the pot F¹² is axially movable relatively to the cores C⁷ and C⁸. The detecting member E³ which, as in the constructions described above, is longitudinally movable in the lower plug A² acts on the lower end wall F¹⁵ of the pot, the usual light spring B³ acting between the upper end wall F¹⁴ of the pot and the upper plug A¹.

It will be seen that the pot F¹² and cores C⁷ and C⁸ which locate the "effective mid-points" of the movable and fixed elements, will tend to be maintained at substantially equal temperatures due to the close contact between the pot and the outer casing so that the said "effective mid-points" will again tend to be maintained coincident in spite of temperature changes, temperature compensation as above described being thus obtained.

The construction shown in Figure 11 is somewhat similar as regards the arrangement of the fixed and movable parts and the air-gaps, to that shown in Figure 9 but it includes neither means for compensating for temperature variations (which can in practice frequently be neglected if the currents flowing in the coils are sufficiently small) nor a device for adjusting the zero setting. This construction has a central core C similar to that shown in Figure 9 but without a transverse hole through its central portion C¹, this portion fitting closely within a tubular pot F⁹ like that shown in Figure 9. The core C can slide within the pot F⁹ but a splined connection F¹⁶ is provided to prevent rotation of the core. The pot F⁹ is provided with upper and lower end plugs P and P¹ having inwardly projecting bosses P² and P³ respectively, the upper airgap H¹¹ being formed between the boss P³ and the core C and the lower airgap H¹² between the core and the boss P⁴. The coils G and G¹ are fixed within the pot F⁹, the bobbins G² and G³ having their inner ends respectively positioned by set screws G⁴ and G⁵ passing through screw-threaded holes in the pot F⁹ whilst their outer ends bear against the inner ends of the pot end plugs P and P¹. The plugs P and P¹ are firmly fixed on the ends of the pot F⁹ by end caps P⁴ and P⁵ respectively which screw on to the outside of the pot at the adjacent ends.

The casing A has at its lower end an end plug R with an axial hole for a plunger E⁵ pressed upwardly by a spring E⁴ and having at its lower end a diamond carrier E⁶. Rotation of the plunger E⁴ is prevented and its longitudinal movement limited by a lateral pin R¹ the inner end of which projects into a slot E⁷ in the plunger. The upper end of the plug R has a spherical bearing surface R² against which is pressed a corresponding bearing surface on the underside of the cap P⁶ when the fixed part of the magnetic circuits, namely the pot F⁹ with the coils, is pressed downwardly by the usual compression spring B¹ between the upper surface of the cap P⁴ and the under surface of the upper casing plug R³ which is provided with a cable grip R⁴ for the leads to the coils G and G¹.

The two ends of the core C, instead of being provided with extensions C² and C³ as in the arrangement shown in Figure 9, have axial holes bored therein for short headed plugs S and S¹ of non-magnetic material, such as brass. The plug S¹ at the lower end of the core has the head domed to engage the upper correspondingly domed end of a distance piece L, which may be of steel or of non-magnetic material, having its lower end projecting into an axial seating recess at the upper end of the plunger E⁵. The plug S at the upper end of the core G is maintained in position by a light compression spring S² (corresponding in function to the spring B³ of the arrangements previously described) which extends through an axial bore in the end plug P and abuts against the under surface of the cap P⁴. An insulating block S³ is secured by a screw S⁴ to the upper surface of the cap P⁴. The block S³ also supports a terminal block S⁵ carrying terminals to which are secured the leads A³ passing through the cable grip R⁴.

It is believed that the operation of this construction will be clear from the above description and that accordingly it need not be described in further detail.

It will be appreciated that though in each of the arrangements for temperature compensation the "effective mid-points" have been described as coincident, such coincidence is not essential since it is only necessary that the relative location of the "effective mid-points," as determined by the locating parts, be maintained in spite of temperature variations. Thus, if the effective mid-points are located so as to be axially spaced apart, for example due to an initial zero adjustment, the said spacing will be maintained in spite of variations in temperature.

It will be understood that the constructions above described are given by way of example only and may be modified to suit requirements.

What I claim as my invention and desire to secure by Letters Patent is:

1. In electrical measuring apparatus, a differential gauge head comprising a casing, a pair of electromagnetic detector devices, each including a coil and at least two parts of magnetic material having cooperating pole faces and relatively movable in a direction at right angles to such pole faces the parts together constituting a magnetic circuit with a variable air gap, mounted within the casing with the coils of the two devices substantially coaxial, a longitudinally movable detecting member extending through that area at one end of the casing which lies in alignment with the detector devices, and means whereby longitudinal movement of the detecting member acts on the relatively movable parts of the two detector devices and causes one variable air gap to be increased and the other to be reduced in accordance with variations in the value to be measured.

2. In electrical measuring apparatus, a differential gauge head comprising a tubular casing, a pair of electromagnetic detector devices, each including a coil and at least two parts of magnetic material having cooperating pole faces and relatively movable in a direction at right angles to such pole faces the parts together constituting a magnetic circuit with a variable air gap, mounted within the casing with the coils of the two devices substantially coaxial, a longitudinally movable detecting member substantially coaxial with the detector coils and extending through that area at one end of the casing which lies in alignment with the detector devices, and means whereby longitudinal movement of the detecting member acts on the relatively movable parts of the two detector devices and causes one variable air gap to be increased and the other to be reduced in accordance with variations in the value to be measured.

3. In electrical measuring apparatus, a differential gauge head comprising a cylindrical casing, a pair of electromagnetic detector devices, each including a coil and at least two parts of magnetic material having cooperating pole faces and relatively movable in a direction at right angles to such pole faces the parts together constituting a magnetic circuit with a variable air gap, mounted within the casing with the coils of the two devices substantially coaxial, a longitudinally movable detecting member extending through that area at one end of the casing which lies in alignment with the detector devices, the casing, the detector devices and the detecting member being arranged as bodies of revolution having a common axis, and means whereby longitudinal movement of the detecting member acts on the relatively movable parts of the two detector devices and causes one variable air gap to be increased and the other to be reduced in accordance with variations in the value to be measured.

4. In electrical measuring apparatus, a differential gauge head comprising a tubular casing, a pair of electromagnetic detector devices mounted substantially coaxially within the casing, each detector device including a coil and at least two parts of magnetic material having cooperating pole faces and relatively movable in a direction at right angles to such pole faces the parts together constituting a magnetic circuit with a variable air gap, one part of each magnetic circuit being fixed relatively to the casing within the normal range of operation of the apparatus, a longitudinally movable detecting member extending through that area at one end of the casing in alignment with the detector devices, and means for connecting the detecting member to the other movable part of each magnetic circuit so that longitudinal movement of the member causes one variable air gap to be increased and the other to be reduced in accordance with variations in the value to be measured.

5. In electrical measuring apparatus, a differential gauge head comprising a tubular casing, a pair of electromagnetic detector devices mounted substantially coaxially within the casing, each detector device including a coil and at least two relatively movable parts of magnetic material constituting a magnetic circuit with a variable air gap, one part of each magnetic circuit being fixed relatively to the casing within the normal range of operation of the apparatus, a longitudinally movable detecting member extending through that area at one end of the casing in alignment with the detector devices, and means for connecting the detecting member to the other movable part of each magnetic circuit so that longitudinal movement of the member causes one variable air gap to be increased and the other to be reduced in accordance with variations in the value to be measured, the fixed parts of the two magnetic circuits being connected together to constitute a single fixed element and the movable parts of the two magnetic circuits also being connected together to form a single movable element, the arrangement being such that the "effective mid-points" of the two elements are located in predetermined positional relationship with respect to the detecting member and a fixed part of the casing adjacent thereto, said two elements including members which connect their effective midpoints respectively to the detecting member and to an adjacent fixed part of the casing and are positioned in close proximity so as to be subjected to substantially the same temperature conditions.

6. Measuring apparatus including the differential gauge head as claimed in claim 5, in which the locating parts are maintained at substantially the same temperature by arranging them close to, and preferably in contact with, each other.

7. In electrical measuring apparatus, a differential gauge head comprising a casing, a pair of electromagnetic detector devices, each including a coil, a fixed pot of magnetic material surrounding the coil and a movable magnetic core member at least a part of which lies within the coil, mounted within the casing with the coils and the cores in substantial alignment, a longitudinally movable detecting member extending through that area at one end of the casing which lies in substantial alignment with the detector devices, and means for connecting the detecting member to the core members of both detector devices so that longitudinal movement of the member causes one variable air gap to be increased and the other to be reduced between the pots and cores of the two devices in accordance with variations in the value to be measured.

8. In electrical measuring apparatus, a differential gauge head comprising a casing, a pair of electromagnetic detector devices, each including a coil, a movable pot of magnetic material surrounding the coil and a fixed magnetic core member at least a part of which lies within the coil, mounted within the casing with the coils and the cores in substantial alignment, a longitudinally movable detecting member extending through that area at one end of the casing which lies in substantial alignment with the detector devices, and means for connecting the detecting member to the pots of both detector devices so that longitudinal movement of the member causes one variable air gap to be increased and the other to be reduced between the pots and cores of the two devices in accordance with variations in the value to be measured.

9. Measuring apparatus including the differential gauge head as claimed in claim 7, in which the core lies wholly within the pot and is provided with end extensions of non-magnetic material preferably coaxial with the core, adapted to slide through end walls of the pot during relative movement of the core and the pot and to support the core within the pot.

10. Measuring apparatus including the differential gauge head as claimed in claim 8, in which the core lies wholly within the pot and is provided with end extensions or plugs of non-magnetic material preferably coaxial with the core, adapted to slide through end walls of the pot during relative movement of the core and the pot and to support the core within the pot.

11. Measuring apparatus including the differential gauge head as claimed in claim 7, in which the pot comprises two tubes of magnetic material arranged coaxially and end to end, the inner ends of the two tubes being separated by a spacing member of non-magnetic material whilst their outer ends are closed.

12. Measuring apparatus including the differential gauge head as claimed in claim 8, in which the variable airgap between the pot and the core in each magnetic circuit comprises a gap coaxial with the core and lying within the associated detector coil.

13. In electrical measuring apparatus, a differential gauge head comprising a casing, a pair of electromagnetic detector devices, each including a coil and at least two relatively movable parts of magnetic material constituting a magnetic circuit with a variable airgap, mounted within the casing with the coils of the two devices substantially coaxial, a longitudinally movable detecting member extending through that area at one end of the casing which lies in alignment with the detector devices, means for connecting the detecting member to one of the relatively movable parts of the magnetic circuit of each detector device so that longitudinal movement of the member causes one variable air gap to be increased and the other to be reduced in accordance with variations in the value to be measured and means for manually effecting relative adjustment of the two parts of each of the magnetic circuits, for the purpose of determining the zero setting of the apparatus.

14. In electrical measuring apparatus, a differential gauge head comprising a casing, a pair of electromagnetic detector devices mounted within the casing and each including a coil and at least two parts of magnetic material having cooperating pole faces and relatively movable in a direction at right angles to such pole faces, the parts together constituting a magnetic circuit with a variable air gap, one part of each magnetic circuit being fixed relatively to the casing within the normal range of operation of the apparatus, a longitudinally movable detecting member extending through that area at one end of the casing in alignment with the detector devices, means connecting the detecting member to the other movable part of each magnetic circuit so that longitudinal movement of the detecting member causes one air gap to be increased and the other to be reduced in accordance with variations in the value to be measured, and a spring loading the fixed part of each magnetic circuit, movement of the detecting member beyond its normal range of travel causing the loading spring to yield thereby permitting the two parts of the magnetic circuit to move as a unit.

15. In electrical measuring apparatus, a differential gauge head comprising a tubular casing, a pair of electromagnetic detector devices mounted substantially coaxially within the casing and each including a coil, a fixed pot of magnetic material surrounding the coil and a movable magnetic core member at least a part of which lies within the coil, the casing with the coils and cores lying in substantial alignment, a longitudinally movable detecting member extending through that area at one end of the casing which lies in substantial alignment with the detector devices, means connecting the detecting member to the movable core members of both detector devices so that longitudinal movement of the detecting member causes one variable air gap to be increased and the other to be reduced, and a loading spring acting in the axial direction between the tubular casing and the posts, which, though fixed relatively to the casing within the normal range of movement of the detecting member will, when the detecting member moves beyond such range, move as a unit with the coils and cores against the action of the said spring.

16. In electrical measuring apparatus, a differential gauge head comprising a tubular casing, a pair of electromagnetic detector devices mounted substantially coaxially within the casing and each including a coil, a fixed pot of magnetic material surrounding the coil and a movable magnetic core extending axially within the coil, the coils, cores and tubular casing being in substantial axial alignment, extensions of non-magnetic material at opposite ends of the cores and coaxial therewith, said extensions sliding in apertures in end walls of the pot, a longitudinally movable detecting member extending through that area at one end of the casing which lies in alignment with the detector devices, and means connecting the detecting member to the cores so that longitudinal movement of the detecting member causes one variable air gap to be increased and the other to be reduced between the pots and cores of the two devices in accordance with variations in the value to be measured.

17. Measuring apparatus including the differential gauge head as claimed in claim 16, in which the end wall of each pot is provided with a plug extending axially into the corresponding coil so that the variable air gap between the pot and core of each magnetic circuit lies wholly within the associated detector coil.

18. In electrical measuring apparatus, a differential gauge head comprising an elongated tubular casing, an integral fixed pot of magnetic material arranged coaxially within said casing, a pair of electromagnetic detector devices axially spaced apart within said pot and each comprising a coil coaxial with the pot, an axially movable common core member of magnetic material and comprising two cores which lie substantially wholly within the two coils respectively and are inter-connected by an intermediate portion of enlarged diameter which lies between the adjacent inner ends of the coils, two end plugs closing the opposite ends of said pot and each having a plug-like part which extends axially into the adjacent end of the associated coil, longitudinal movement of the core member thus increasing the air gap within one coil between the corresponding core and end plug whilst decreasing the air gap between the corresponding parts associated with the other coil, extensions of non-magnetic material at opposite ends of the core member, said extensions sliding in apertures in said end plugs, a longitudinally movable detecting member extending axially from the tubular casing at one end thereof, means interconnecting the detector member and the core member, and a loading spring acting axially between the tubular casing and the pot which, though fixed relatively to the casing within the normal range of movement of the detecting member will, when the detecting member moves beyond such range, move as a unit with the coils and core member against the action of the loading spring.

RICHARD EDMUND REASON.